United States Patent
Mestanov et al.

(10) Patent No.: US 9,585,066 B2
(45) Date of Patent: Feb. 28, 2017

(54) METHODS AND NODES FOR INFORMATION TRANSFER IN WLAN

(71) Applicant: Telefonaktiebolaget L M Ericsson (publ), Stockholm (SE)

(72) Inventors: Filip Mestanov, Sollentuna (SE); Stephen Rayment, Ottawa (CA); Christofer Lindheimer, Linköping (SE); Guido Hiertz, Aachen (DE); Eric Nordström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 114 days.

(21) Appl. No.: 14/405,333

(22) PCT Filed: Sep. 4, 2014

(86) PCT No.: PCT/SE2014/051018
§ 371 (c)(1),
(2) Date: Dec. 3, 2014

(87) PCT Pub. No.: WO2015/108462
PCT Pub. Date: Jul. 23, 2015

(65) Prior Publication Data
US 2016/0219463 A1     Jul. 28, 2016

Related U.S. Application Data

(60) Provisional application No. 61/928,013, filed on Jan. 16, 2014.

(51) Int. Cl.
*H04W 36/00* (2009.01)
*H04W 28/08* (2009.01)
(Continued)

(52) U.S. Cl.
CPC ....... *H04W 36/0022* (2013.01); *H04W 28/08* (2013.01); *H04W 48/14* (2013.01);
(Continued)

(58) Field of Classification Search
CPC .................. H04W 36/0022; H04W 48/14; H04W 84/12; H04W 88/10
(Continued)

(56) References Cited

U.S. PATENT DOCUMENTS

2006/0126565 A1   6/2006   Shaheen
2007/0297373 A1   12/2007  Saifullah et al.
(Continued)

FOREIGN PATENT DOCUMENTS

| WO | WO 2007/103055 A2 | 9/2007 |
| WO | WO 2011/141801 A1 | 11/2011 |
| WO | WO 2012/041532 A1 | 4/2012 |
| WO | WO 2012/149400 A2 | 11/2012 |
| WO | WO 2013/180956 A1 | 12/2013 |

OTHER PUBLICATIONS

International Search Report, International Application No. PCT/SE2014/051018 mailed Mar. 25, 2015, 6 pages.
(Continued)

*Primary Examiner* — Marcos Batista
(74) *Attorney, Agent, or Firm* — Myers Bigel, P.A.

(57) ABSTRACT

A method and a wireless access node for enabling management of cellular connectivity of a wireless device as well as a method and a wireless device for providing information about availability of cellular connectivity towards a radio network node are disclosed. The wireless device has Wi-Fi radio for access to the wireless access node and cellular radio for access to the radio network node. The wireless device sends, to the wireless access node, a second message, which indicates to the wireless access node availability of the cellular connectivity. The wireless access node manages the cellular connectivity based on the second message.

24 Claims, 6 Drawing Sheets

(51) Int. Cl.
*H04W 48/14* (2009.01)
*H04W 88/06* (2009.01)
*H04W 36/14* (2009.01)
*H04W 84/12* (2009.01)
*H04W 88/10* (2009.01)

(52) U.S. Cl.
CPC ............ *H04W 36/14* (2013.01); *H04W 84/12* (2013.01); *H04W 88/06* (2013.01); *H04W 88/10* (2013.01)

(58) Field of Classification Search
USPC .......................................... 455/436; 370/338
See application file for complete search history.

(56) References Cited

U.S. PATENT DOCUMENTS

| | | | | |
|---|---|---|---|---|
| 2013/0267203 | A1* | 10/2013 | Qiang | H04W 48/18 455/411 |
| 2014/0126388 | A1* | 5/2014 | Shin | H04W 48/20 370/252 |

OTHER PUBLICATIONS

Written Opinion of the International Searching Authority, International Application No. PCT/SE2014/051018 mailed Mar. 25, 2015, 8 pages.

Wi-Fi Alliance: "Wi-Fi Certified Passpoint (TM) (Release 1) 6 Deployment Guidelines", Oct. 1, 2011, pp. 1-25, XP055080844, 26 pages.

IEEE: "IEEE Standard for Information Technology—Telecommunications and information exchange between systems local and metropolitan area networks—Specific requirements Part 11: Wireless LAN Medium Access Control (MAC) and Physical Layer (PHY) Specifications; IEEE Std 802.11-2012 (Revision of IEEE Std 802.1", IEEE STD 802.11-2012, IEEE Computer Society, New York, USA, Mar. 29, 2012, 2793 pages.

Intel et al: "Solution for Trusted WLAN access to EPC", 3GPP Draft; S2-113148V2, $3^{rd}$ Generation Partnership Project (3GPP), Mobile Competence Centre; 650, Route Des Lucioles; F-06921 Sophia-Antipolis Cedex; France, vol. SA WG2, no. Naantali; Jul. 5, 2011, XP050548468, 8 pages.

* cited by examiner

METHODS AND NODES FOR INFORMATION TRANSFER IN WLAN

CROSS REFERENCE TO RELATED APPLICATION

This application is a 35 U.S.C. §371 national stage application of PCT International Application No. PCT/SE2014/051018, filed on 4 Sep. 2014, which itself claims priority to U.S. provisional Application No. 61/928,013, filed 16 Jan. 2014, the disclosures and contents of both of which are incorporated by reference herein in their entirety.

TECHNICAL FIELD

Embodiments herein relate to wireless communication systems, such as telecommunication systems. A method and a wireless device for providing information about cellular connectivity as well as a method and a wireless access node for enabling management of cellular connectivity are disclosed. Moreover, a corresponding computer program and a computer program product are disclosed.

BACKGROUND

In Institute of Electrical and Electronics Engineers (IEEE), Wireless Local Area Network (WLAN) is standardized in the IEEE 802.11 specifications, e.g. in IEEE Standard for Information technology—Tele-communications and information exchange between systems, Local and metropolitan area networks—Specific requirements, Part 11: Wireless LAN Medium Access Control (MAC) and Physical Layer (PHY) Specifications. WLAN is a technology that mainly operates in the 2.4 GHz or 5 GHz band. The IEEE 802.11 specifications regulate the physical layer between access points and wireless terminals, MAC layer and other aspects to secure compatibility and interoperability between access points and portable terminals, referred to as STA herein. WLAN is generally operated in unlicensed bands, and as such, communication over WLAN may be subject to interference sources from any number of known and unknown devices. WLAN is commonly used as wireless extensions to fixed broadband access, e.g. in domestic environments and hotspots like airports, train stations and restaurants and the like.

Recently, WLAN has been subject to increased interest from cellular network operators, not only as an extension to fixed broadband access. Instead, the interest is mainly focused on using the WLAN technology as an extension, or alternative to, cellular radio access network technologies. By use of WLAN technology as an extension to cellular radio access network technologies it is contemplated that an ever increasing wireless bandwidth demand may be handled. Cellular operators that currently serve mobile users with, e.g. any of the Third Generation Partnership Project (3GPP) technologies, Long Term Evolution (LTE), Universal Mobile Telecommunications System (UMTS)/Wideband Code Division Multiple Access (WCDMA), or Global System for Mobile communications (GSM), treat WLAN as a technology that may provide good support in their regular cellular networks. The term "operator-controlled WLAN" refers to a WLAN deployment that on some level is integrated with a cellular network operator's existing network and where the 3GPP radio access networks and the WLAN wireless access may even be connected to the same core network and provide the same services.

Currently, there is intense activity in the area of operator-controlled WLAN in several standardization organizations. In 3GPP, activities to connect WLAN access points to the 3GPP-specified core network are pursued. Furthermore, in the Wi-Fi Alliance (WFA), activities related to certification of WLAN products are undertaken. The certification of WLAN products is to some extent also driven by the need to make WLAN a viable wireless technology for cellular operators seeking to support high bandwidths in their networks. The term WLAN offload is commonly used and points towards that cellular network operators seek means to offload traffic from their cellular networks to WLAN, e.g. in peak-traffic-hours and in situations when the cellular network for one reason or another needs to be off-loaded, e.g. to provide requested quality of service, maximize bandwidth or simply for coverage. Furthermore, the operators are also seeking effective ways for moving terminals from the WLAN back to the 3GPP networks, e.g. if the network conditions have changed. Such activities are currently being promoted in the WFA.

A wireless operator, offering a mix of two technologies that are standardized in isolation from each other, i.e. the WLAN technologies and the cellular technologies, is thus faced with a challenge of providing intelligent mechanisms for co-existence of these technologies within one system that is controlled and operated by the wireless operator. As mentioned above, up until now, 3GPP and WLAN have evolved as two separate systems, being standardized up to a great extend in isolation from each other. However, recent activities in 3GPP and WFA have taken initiatives to improve the interoperability between the WLAN and cellular technologies. Increased interoperability is intended to provide mobile operators, or wireless operators, with greater control over their "operator-controlled" WLANs.

These recent activities have for example dealt with how to steer portable terminals from WLAN to cellular network.

In WFA, there have been activities that look into the problem of moving terminals from WLAN to the cellular network. A couple of use-cases have been proposed.

An "at-association" use case is proposed. This use-case describes the scenario where a STA, during the connection procedure to WLAN, is moved to the cellular network due to, e.g. high load in the WLAN, unsatisfactory local interference environment, etc.

A "post-association" use-case is proposed. This use-case describes the scenario where a STA, after having been connected to WLAN for a certain amount of time, is moved to the cellular network.

"At-Association" Use-Case

A multi-mode STA, having both, at least one Wi-Fi radio and at least one cellular radio technology, attempts to associate to an Access Point (AP). The AP may have knowledge of its current load, the interference situation, U/L signal strength at the AP and AP network connection status. Because of one or more of these parameters, the AP refrains from accepting additional STAs to its network.

To solve the problem, the AP should be able to explicitly steer or direct the multi-mode STA to a network that could provide a better service—in this case a cellular one. In this way, the Wi-Fi load is not further aggravated and the user experience is maintained or improved.

The AP and the cellular base station may be co-located, e.g. in an integrated picocell, or may be separate Wi-Fi APs "under", i.e. controlled by, a macro cellular basestation.

The cellular and Wi-Fi networks may be authenticated by the same operator. Both networks are typically, but not necessarily, deployed by the same operator who strives to offload or maximize user experience.

"Post-Association" Use-Case

A multi-mode STA, having both Wi-Fi radio(s) and cellular radio(s), is associated to an AP. The AP has knowledge of its current load, the interference situation, U/L signal strength at the AP and AP network connection status. At a certain point in time, one or more of these parameters reach an unacceptable level.

To solve the problem, the AP should be able to explicitly steer or direct the multi-mode STA to a network that could provide a better service—in this case a cellular one. In that way, the Wi-Fi load is alleviated and the user experience is maintained or improved.

The AP and the cellular basestation may be co-located, e.g. in an integrated picocell, or may be separate Wi-Fi APs "under" a macro cellular basestation.

The cellular and Wi-Fi networks may be authenticated by the same operator. Both networks are typically, but not necessarily, deployed by the same operator looking to offload or maximize user experience.

In both use-cases described above, a problem is related to how the AP shall obtain knowledge about that the particular STA that it attempts to steer to the cellular network has indeed connection to that cellular network.

SUMMARY

An object may be to alleviate or at least reduce the above mentioned problem.

According to a first aspect, the object is achieved by a method, performed by a wireless access node for enabling management of cellular connectivity of a wireless device. The cellular connectivity relates to connectivity towards a radio network node. The wireless device has Wi-Fi radio for access to the wireless access node and cellular radio for access to the radio network node. The wireless access node receives, from the wireless device, a second message, which indicates to the wireless access node availability of the cellular connectivity. The wireless access node manages the cellular connectivity based on the second message.

According to a second aspect, the object is achieved by a wireless access node configured to enable management of cellular connectivity of a wireless device. The cellular connectivity relates to connectivity towards a radio network node. The wireless device has Wi-Fi radio for access to the wireless access node and cellular radio for access to the radio network node. The wireless access node is configured to receive, from the wireless device, a second message, which indicates to the wireless access node availability of the cellular connectivity; and to manage the cellular connectivity based on the second message.

According to a third aspect, the object is achieved by a method, performed by a wireless device for providing information about cellular connectivity towards a radio network node. The wireless device has Wi-Fi radio for access to a wireless access node and cellular radio for access to the radio network node. The wireless device sends, to the wireless access node, a second message, which indicates to the wireless access node availability of the cellular connectivity.

According to a fourth aspect, the object is achieved by a wireless device configured to provide information about cellular connectivity, i.e. availability of cellular connectivity towards a radio network node. The wireless device has Wi-Fi radio for access to a wireless access node and cellular radio for access to the radio network node. The wireless device is configured to send, to the wireless access node, a second message, which indicates to the wireless access node availability of the cellular connectivity.

According to further aspects, a computer program and a computer program product corresponding to the method above are provided.

According to some embodiments, a wireless access node is able to query a wireless device with regard to the availability of a cellular network and/or a connection to a cellular network.

An advantage with some embodiments herein is that it is possible for the wireless access node to direct a wireless device towards a cellular network if the cellular network is available and e.g. if the wireless access node for example is heavily loaded with traffic and/or connections to further wireless devices.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
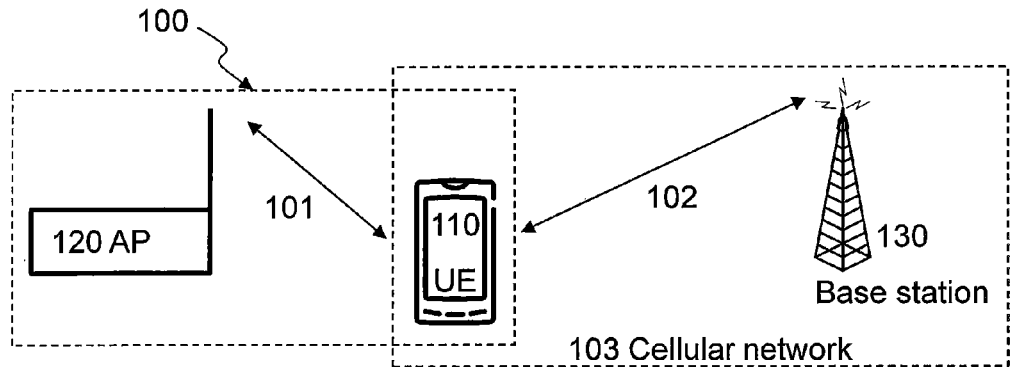
FIG. 1 is a schematic overview of an exemplifying wireless network in which embodiments herein may be implemented.

Throughout the following description similar reference numerals have been used to denote similar elements, units, modules, circuits, nodes, parts, items or features, when applicable. In the Figures, features that appear in some embodiments are indicated by dashed lines.

FIG. 1 depicts an exemplifying wireless network 100 in which embodiments herein may be implemented. In this example, the wireless network 100 is a Wireless Fidelity (Wi-Fi) network, such as according to one of the standards in the 802.11-standards suite. In other examples, the wireless network may be referred to as a Wireless Local Area Network (WLAN) or the like.

The wireless network 100 comprises a wireless device 110, or STA, WLAN STA, and a wireless access node 120, or WLAN AP. A state, in which the wireless device 110 is connected to the wireless access node 120, may be referred to as post-association as mentioned in the background section. Similarly, another state, in which the wireless device seeks to establish a connection to the wireless access node, may be referred to as pre-association or at-association as mentioned in the background section. Depending on post- and pre-association, the wireless device 110 may communicate 101 wirelessly, e.g. via a radio interface, with the wireless access node 120, aka wireless access point. Some first embodiments relate to post-association and some second embodiment relate to pre-association.

The wireless device 110 is a multi-mode wireless device. This means that the wireless device 110 is capable of communicating with the wireless access node 120 as mentioned above. In addition thereto, the wireless device 110 is capable of communicating 102 with a radio network node 130 shown in FIG. 1. Hence, the wireless device 110 is capable of connectivity towards the wireless access node 120, using Wi-Fi, and towards the radio network node 130, using a radio access technology, such as a cellular radio network 103. The cellular network may be any 3GPP network or an evolution thereof. Connectivity refers to that the wireless device 110 may have a connection towards the wireless access node and/or the radio network node. Moreover, connectivity refers to that the wireless device 110 has detected that a connection towards the wireless access node and/or the radio network node may be requested since the wireless access node and/or the radio network node is available, e.g. discovered by the wireless device.

As used herein, the term "wireless device" may refer to a WLAN station (WLAN STA), a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, an embedded processor equipped with radio communication capabilities or connected to a modem, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may refer to the wireless device.

As used herein, the term "wireless access node" may refer to a WLAN Access Point (WLAN AP or AP for short), a wireless access point, a wireless router, a wireless gateway or the like.

As used herein, the term "radio network node" may refer to a radio base station, an evolved Node B, an eNB, a Node B, a radio network controller, a Remote Radio Unit (RRU), a basestation, a relay, a repeater or the like.

Figure 2:
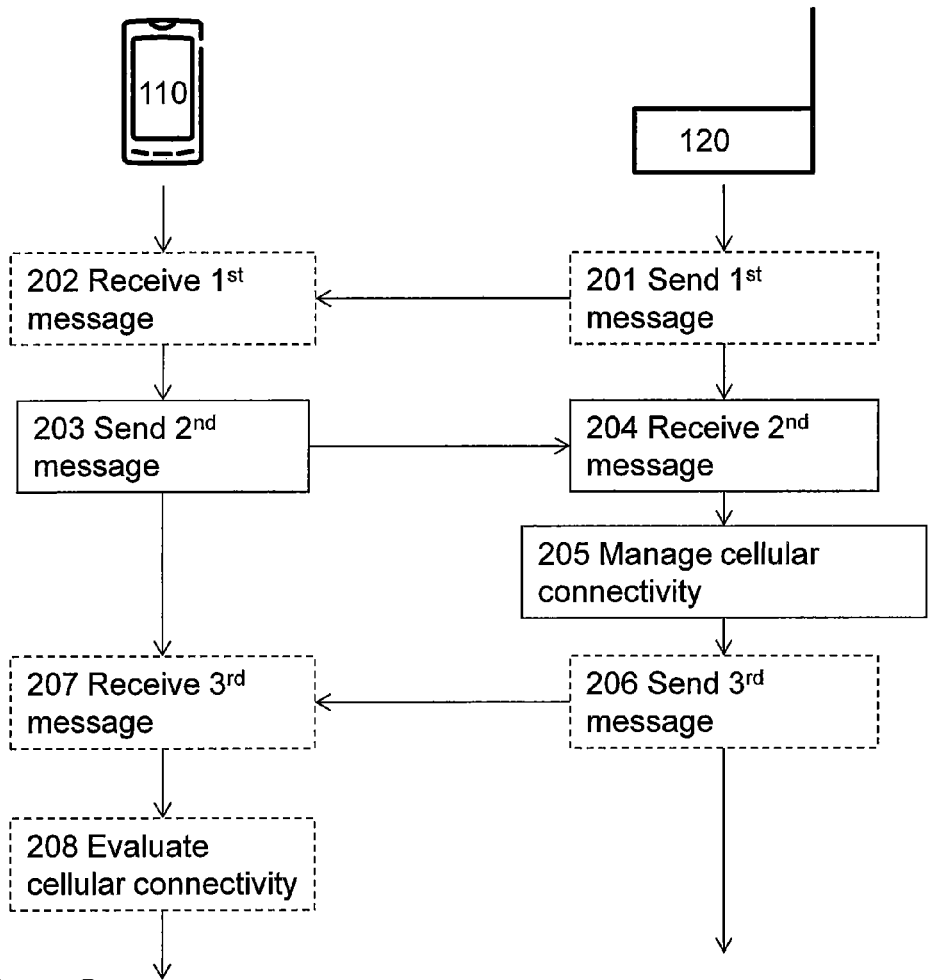
FIG. 2 is a schematic, combined signaling scheme and flowchart illustrating embodiments of the methods when performed in the wireless network according to FIG. 1.

FIG. 2 illustrates an exemplifying method for according to embodiments herein when performed in connection with the wireless network 100 of FIG. 1. The wireless access node 120 performs a method for enabling management of cellular connectivity of a wireless device 110.

The cellular connectivity relates to connectivity towards a radio network node 130. The wireless device 110 has Wi-Fi radio for access to the wireless access node 120 and cellular radio for access to the radio network node 130. As mentioned above, this means that the wireless device 110 is a multi-mode wireless device 110 having, i.e. is equipped with, Wi-Fi radio for access to the wireless access node 120 and cellular radio for access to the radio network node 130. Elaborating further on that the wireless device 110 has Wi-Fi and cellular radio, it shall be understood that the wireless device 110 may comprise one or more radio modules for managing Wi-Fi and cellular radio connectivity.

The wireless device 110 performs a method for providing information about availability of cellular connectivity towards a radio network node 130. The wireless device 110 is a wireless device 110 having Wi-Fi radio for access to a wireless access node 120 and cellular radio for access to the radio network node 130.

Initially, the wireless device 110 may have detected connectivity towards the radio network node 130, e.g. the cellular network 103 is available for connection.

As mentioned above, the wireless device 110 may be post- or pre-association with respect to the wireless network 100.

The following actions may be performed in any suitable order

Action 201

In order for the wireless access node 120 to be able to query the wireless device 110 about information to be used in e.g. action 205 below, the wireless access node 120 may, according to some first embodiments, send a first message to the wireless device 110. This means that the first message may be sent for querying information about the availability of the cellular connectivity.

With the first embodiments, the first message may be used in conjunction with post-association. As an example, the first message may be a Wireless Network Management (WNM)- Notification request frame, or WNM-Notification request for short, as is explained in more detail with reference to FIG. 3. The WNM-Notification request may also be referred to as a WNM-Notification request message. The first message causes the wireless device 110 to send the second message indicating the availability of the cellular connectivity as in action 203.

Action 202

When action 201 has been performed, the wireless device 110 may receive the first message from the wireless access node 120. As mentioned above, the first message may cause the wireless device 110 to perform action 203.

Action 203

In order for the wireless device 110 to make the wireless access node 120 aware of whether the wireless device 110 has, or is capable of obtaining, a cellular connection to a cellular network, e.g. via the radio network node 130, the wireless device 110 sends a second message. The second message indicates to the wireless access node 120 availability of the cellular connectivity. In this manner, the wireless device 110 informs the wireless access node 120 about connectivity towards the cellular network. Accordingly, information about connectivity towards the cellular network may be provided by the second message.

According to the first embodiments, action 203 may be performed in response to the reception of the first message in action 202. Moreover, the second message may be the WNM-Notification-response as is explained in more detail with reference to FIG. 3.

In some second embodiments, the second message may be, or comprise, a Generic Advertisement Service (GAS) initial response/comeback request including an ANQP query with a special query element as is explained in more detail with reference to FIG. 6.

Moreover, in some examples of the second embodiments, in addition to or as an alternative the GAS initial response/ comeback request, the second message may comprise a Probe request, or Probe request message and/or an Association Request. In these examples, a bit of the Extended Capabilities may be used to indicate availability of the cellular connectivity. The second message may include a vendor specific information element during at-association. See also description in connection with FIG. 6 below.

Action 204

The wireless access node 120 receives the second message from the wireless device 110. The second message indicates to the wireless access node 120 whether the wireless device has or may obtain the cellular connection, i.e. availability of the cellular connectivity. Now that the wireless access node 120 is aware of whether the cellular connection exists or can be established, it may perform action 205.

This means that the wireless access node 120 is able to select the cellular connection (or cellular connectivity) based on the second message. Hence, the wireless device 110 enables the wireless access node 120 to manage the cellular connectivity by providing the second message.

In the first embodiments, the wireless access node 120 is informed about whether the wireless device has, or is capable of obtaining, the cellular connection, by interpreting the WNM-Notification-response.

In the second embodiments, the wireless access node 120 is informed about whether the wireless device has, or is capable of obtaining, the cellular connection, by interpreting the special query element of the GAS initial response/comeback request and/or the Probe Response.

Action 205

The wireless access node 120 manages the cellular connectivity, e.g. the cellular connection of the wireless device 110, based on the second message.

As an example, the wireless access node 120 may manage the cellular connectivity by instructing the wireless device 110 to use the cellular connectivity, e.g. the cellular connection which may already exist or which may be established, for transmissions to/from the wireless device 110.

For example, if the second message indicates to the wireless access node 120 that cellular connection is possible for the wireless device and if the wireless access node 120 is heavily load in terms of traffic, number of connected devices or the like, the wireless access node 120 may decide to instruct the wireless device 110 to establish a cellular connection to the radio network node 130. In a similar example, the cellular connection may be established, i.e. the connection does not already exist, in order to offload, e.g. in terms of traffic, number of connected devices etc., the wireless access node 120.

Action 206

Accordingly, based on the outcome of action 205, the wireless access node 120 may send a third message to the wireless device 110. The third message may indicate to the wireless device that access to the WLAN is denied. The wireless device 110 may then attempt to establish, if not already existing, a cellular connection to the radio network node 130.

Action 207

The wireless device 110 may receive the third message. The wireless device 110 interprets the third message and acts accordingly, e.g. the wireless device 110 may attempt to establish a cellular connection to the radio network node 130 as mentioned above.

Action 208

The wireless device 110 may evaluate the cellular connectivity towards the radio network node 130. This means that the wireless device 110 may have detected connectivity, i.e. existing or possible connection to the radio network node 130, i.e. the cellular network.

This action is preferably performed before action 203. Hence, the second message may be based on an outcome of the evaluation. As an example, the second message indicates no access to the radio network node 130 if the evaluation results in that the wireless device 110 is not granted access to the radio network node 120. Similarly, the second message indicates access to the radio network node 130 if the evaluation results in that the wireless device 110 is granted, or is potentially granted, access to the radio network node 120.

The first embodiments are illustrated with reference to FIG. 3.

In the first embodiments, which address the "Post-Association" use-case, signaling between the WLAN AP and the WLAN STA is introduced. The signaling is based on transmission 301 of a WNM-Notification Request frame from the WLAN AP to the WLAN STA. The WNM-Notification Request is with regard to the availability of a cellular network and/or connection to a cellular network. The WNM-Notification Request is followed by transmission 302 of a WNM-Notification Response frame from the WLAN STA to the WLAN AP, as shown in FIG. 3. The WNM-Notification Response is with regard to the availability of a cellular network and/or connection to a cellular network. This embodiment relates to when the STA has an existing connection towards the AP as indicated by the post-association use case.

The signaling, e.g. the second message in the form of the WNM-Notification response, provides information about the cellular connectivity.

Figure 4:
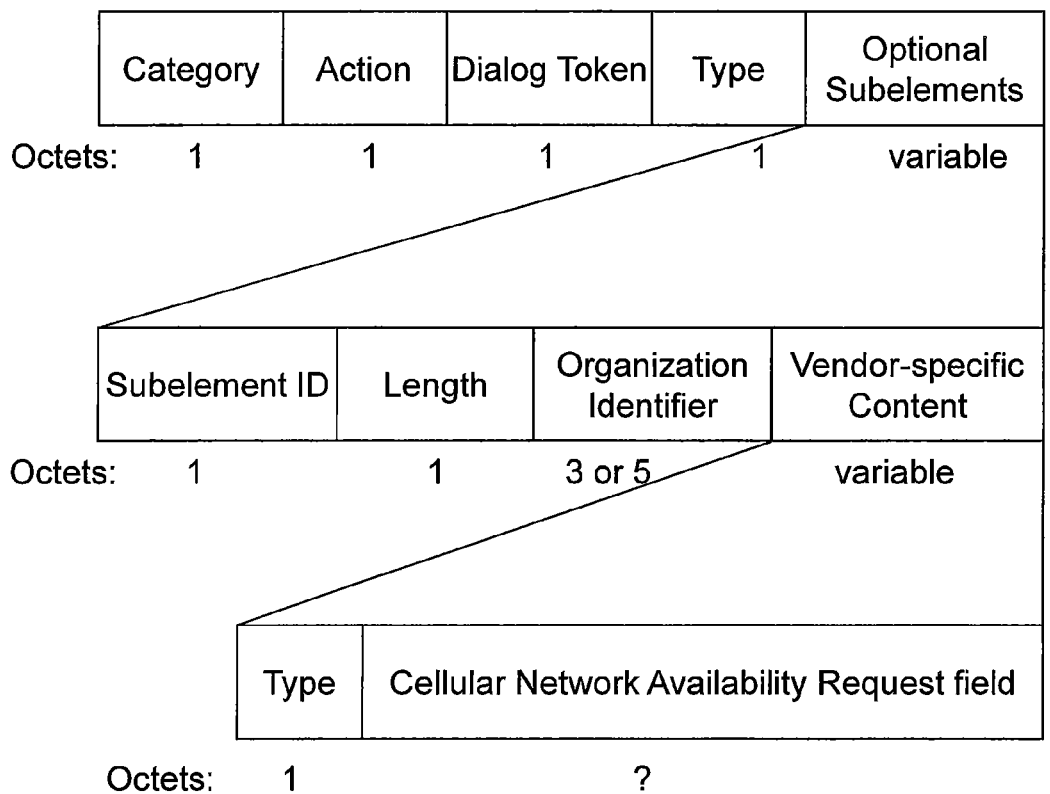
FIG. 4 is a block diagram illustrating a WNM-Notification request field.

The WNM-Notification Request frame is formatted in accordance with IEEE 802.11-2012, Chapter 8.5.14.28, where the "Optional Subelement" field is formatted as a "Vendor specific element", Chapter 8.4.2.28 of IEEE 802.11-2012. Furthermore, the "Vendor specific element" is formatted in accordance to the Wi-Fi Alliance (WFA) rules for such type of frames, as shown in FIG. 4. The fields contain the following information:

The "Subelement ID" is set to value "221" ("Vendor Specific", as specified by IEEE)

The "Organization Identifier" field is set to "0x50 6F 9A" (as requested by WFA guidelines)

The "Type" is set to "0x01" (in conjunction with the "WFA Technology Assignments" instructions)

The "Cellular network availability Request field" is used to query about one or more of:
  Availability of a cellular network (coverage), possibly including network quality related information, e.g. signal level, noise level, network load, etc.
  Availability of a connection to a cellular network, e.g. whether the STA is currently Attached to the network, whether it has active session, where sessions could be circuit and/or packet domain ones
  Identity of the network operator, e.g. PLMN
  Identity of the observed cellular network nodes, e.g. Cell ID, TA, RA, etc.
  Condition of the network
  Duration of connectivity to the cellular network
  IPv6 and/or IPv4 connectivity in cellular
  Cellular network type and capabilities, e.g. supports HSDPA, supports MIMO, Carrier aggregation, etc.
  Cellular network frequency
  IP addresses, Real or NAT address
  Maximum transmission speed within cellular network
  Remaining traffic budget within cellular network.

The "Cellular network availability Request field" may be only one bit or it may comprise several bits.

As an example related to the case when the Cellular network availability request field includes cellular network type and capabilities, it may be understood to mean that if a cellular network type and capability is signaled then the wireless device has cellular radio, i.e. a physical device, but further information needs to be given in order to inform the wireless access node about the availability of the cellular connectivity.

Figure 5:
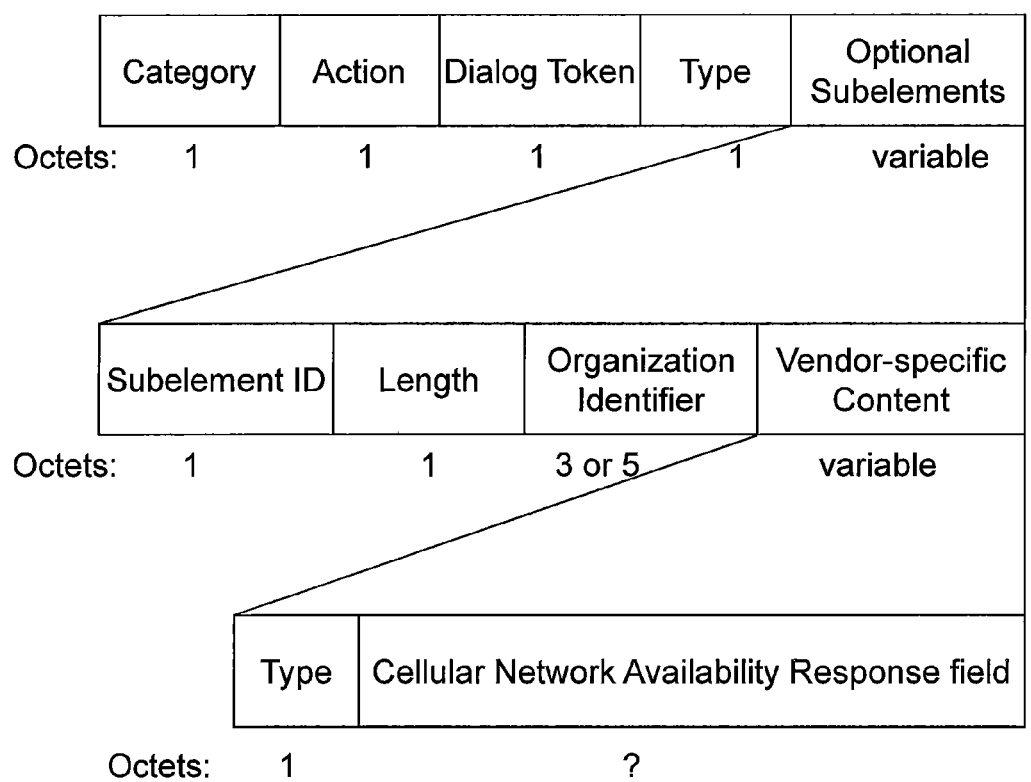
FIG. 5 is a block diagram illustrating a WNM-Notification response field.

The WNM-Notification Response is formatted in accordance with IEEE 802.11-2012 (Chapter 8.5.14.28), where the "Optional Subelement" field is formatted as a "Vendor specific element" (Chapter 8.4.2.28 of IEEE 802.11-2012). Furthermore, the "Vendor specific element" is formatted in accordance to the Wi-Fi Alliance (WFA) rules for such type of frames, as shown in FIG. 5. The fields contain the following information:

- The "Subelement ID" is set to value "221" ("Vendor Specific", as specified by IEEE)
- The "Organization Identifier" field is set to "0x50 6F 9A" (as requested by WFA guidelines)
- The "Type" is set to "0x01" (in conjunction with the "WFA Technology Assignments" instructions)
- The "Cellular network availability Response field" is used to provide information about one or more of:
    - Availability of a cellular network (coverage), possibly including network quality related information, e.g. signal level, noise level, network load, etc.
    - Availability of a connection to a cellular network, e.g. whether the STA is currently Attached to the network, whether it has active session, where sessions could be circuit and/or packet domain ones
    - Identity of the network operator, e.g. PLMN
    - Identity of the observed cellular network nodes, e.g. Cell ID, TA, RA, etc.
    - Condition of the network
    - Duration of connectivity to the cellular network
    - IPv6 and/or IPv4 connectivity in cellular
    - Cellular network type and capabilities, e.g. supports HSDPA, supports MIMO, Carrier aggregation, etc.
    - Cellular network frequency
    - IP addresses, Real or NAT address
    - Maximum transmission speed within cellular network
    - Remaining traffic budget within cellular network In another embodiment, which addresses the "At-Association", or "pre-association", use-case, the WLAN STA communicates to the WLAN AP information regarding the availability of a cellular network and/or connection to the cellular network. This embodiment relates to when the STA is about to establish a connection to the AP. This means that the second message, mentioned in conjunction with Figure may include a vendor specific information element during at-association.

One possibility to implement this is to extend the currently existing pre-association discovery procedure. An example frame exchange for the pre-association discovery procedure is described with reference to in FIG. 6.

The following actions may be performed in any suitable order.

Action 601
If the STA is relying on passive scanning procedures for AP discovery, the STA waits until it receives a Beacon frame (HotSpot 2.0 indication) from the AP.

Action 602
If the STA uses active scanning, it can generate a Probe Request (HotSpot 2.0 indication) and send it to the AP.

Action 603
The AP answers with Probe Response (HotSpot 2.0 indication).

Action 604
After the STA recognized that the AP supports GAS. The STA then generates a GAS Initial Request in order to obtain information about an internetworking service, e.g. the availability of the cellular connectivity.

Action 605
The AP responds with GAS Initial Response. If the information requested by the STA cannot be fitted into one GAS frame and fragmentation is needed, the AP includes a GAS Query ID and GAS Comeback Delay information. The delay indicates the amount of time that the requesting STA should wait before another GAS Comeback frame exchange can be performed.

Action 606
After the GAS Comeback Delay has expired, the STA sends a GAS Comeback Request requesting the remaining information. The STA must use the same Query ID, as previously assigned by the AP.

Action 607
The AP responds with GAS Comeback Response. Once all the GAS Comeback Response frames have been received (the AP indicates the last fragment by setting the "More GAS Fragments" bit in the Fragment ID field in the GAS Comeback Response to "1"), the STA can defragment and process the information.

In the "Advertisement Protocol Element" field, part of the GAS frame, the STA can include an ANQP query. ANQP queries are used to obtain miscellaneous network information, including Network Access Identifier (NAI) Realm, 3GPP Cellular Network Information, etc. The miscellaneous network information is given by a query element name—see Table 1 below. If the STA is performing an ANQP query it includes query list, describing all the information that the STA is querying for.

The AP might forward or proxy the ANQP queries to a backend advertisement server if the requested information is not locally available the AP;

As seen from the Figure, the procedure does not currently provide the opportunity for the WLAN STA to communicate information to the WLAN AP, rather to query for information. As an extension of the current procedure, the query could include a special query element and if the STA includes this element in the query list, the AP is to interpret this as the STA notifying it about the availability of a cellular network and/or a connection to a cellular network. In the currently existing technology, the following values are included in the query list:

TABLE 1

Query Element Names.

| Query Element Name | Subtype Value |
|---|---|
| Reserved | 0 |
| HS Query list | 1 |
| HS Capability list | 2 |
| Operator Friendly Name | 3 |
| WAN Metrics | 4 |
| Connection Capability | 5 |
| NAI Home Realm Query | 6 |
| Operating Class Indication | 7 |
| OSU Providers list | 8 |
| Reserved | 9 |
| Icon Request | 10 |
| Icon Binary File | 11 |
| Reserved | 12-255 |

As an extension to Table 1, the special query element may have a value greater than 11, resulting in e.g.:

| Query Element Name | Subtype Value |
|---|---|
| Reserved | 0 |
| HS Query list | 1 |
| ... | ... |
| Icon Binary File | 11 |
| Cellular network and/or connection to cellular network available | 12 |
| Reserved | 13-255 |

Hence, the query element name with subtype value 12 is in this example the special query element.

In other examples, the query element name may be different while still having the same meaning as herein. Moreover, the subtype value may in other examples be different from 12, i.e. any non-defined subtype value could be used, e.g. taken from the range 12-255.

Another possibility to implement this is by amending the so called Extended Capabilities, which the STA communicates to the AP upon connecting to it. For example, one bit variable could be introduced that the STA has a connection via a cellular technology. The "Extended Capabilities" field is a field that may be carried by several different frames that are exchanged between the AP and the STA and either one may include "Extended Capabilities" information.

Figure 6:
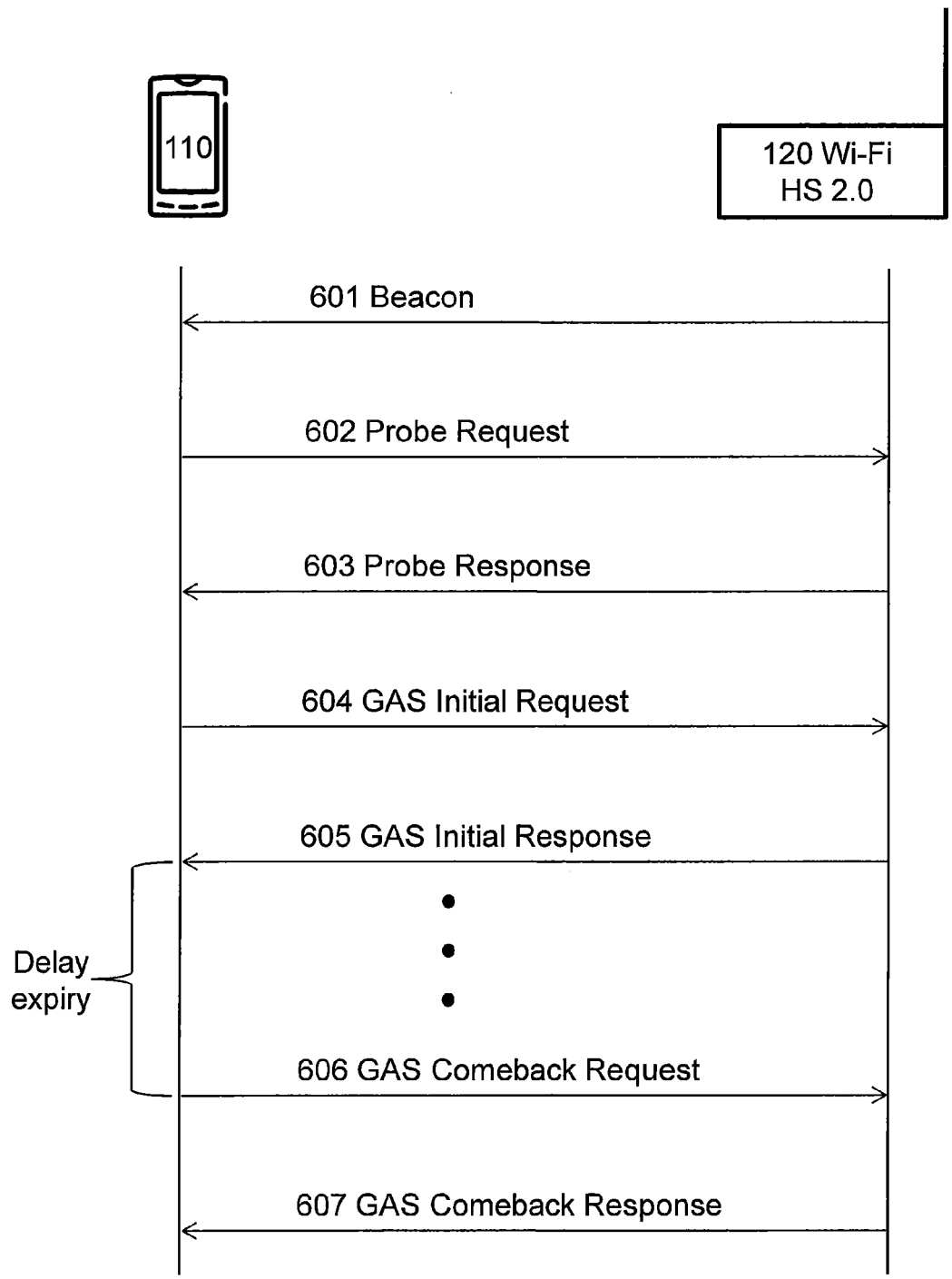
FIG. 6 is a further schematic, combined signaling scheme and flowchart illustrating some second embodiments herein.

Examples of frames that may carry the "Extended Capabilities" information are the Probe Request and Probe Response frames as shown in FIG. 6. There are also other messages/frames, such as Association Request/Response, Authentication Request/Response, etc. that may carry the "Extended capabilities" information.

Figure 7:
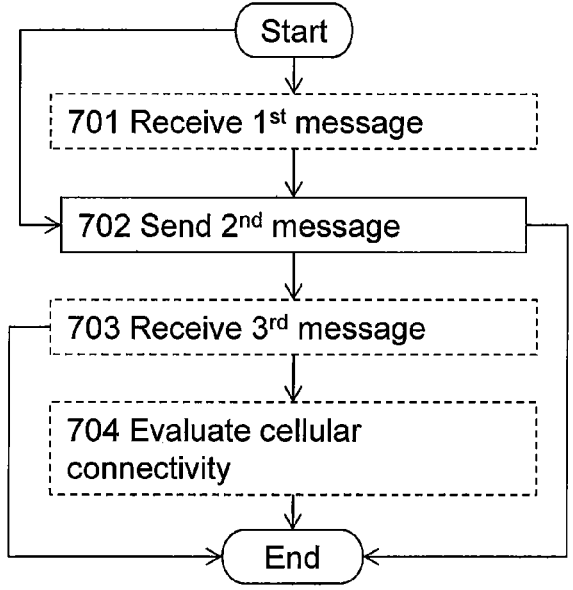
FIG. 7 is a flowchart illustrating embodiments of the method in the wireless device.

In FIG. 7, an exemplifying, schematic flowchart of the method in the wireless device 110 is shown. Hence, the wireless device 110 performs a method for providing information about availability of cellular connectivity towards a radio network node 130.

As mentioned, the wireless device 110 has Wi-Fi radio for access to a wireless access node 120 and cellular radio for access to the radio network node 130.

The following actions may be performed in any suitable order. These actions are similar to the actions in FIGS. 2, 3 and/or 6.

Action 701

The wireless device 110 may receive, from the wireless access node 120, a first message for querying information about the availability of the cellular connectivity, whereby the first message causes the wireless device 110 to send the second message indicating the availability of the cellular connectivity. The first message may be a WNM-Notification-request. This action is similar to action 202.

Action 702

The wireless device 110 sends, to the wireless access node 120, a second message, which indicates to the wireless access node 120 availability of the cellular connectivity. The second message may be a WNM-Notification-response, a GAS initial response/comeback request including an ANQP query with a special query element, a Probe request message and/or an Association Request. This action is similar to action 203. The second message may include a vendor specific information element during at-association.

Action 703

The wireless device 110 may receive a third message. The wireless device 110 interprets the third message and acts accordingly, e.g. the wireless device 110 may attempt to establish a cellular connection to the radio network node 130 as mentioned above. This action is similar to action 207.

Action 704

The wireless device 110 may evaluate 208 the cellular connectivity towards the radio network node 130. The second message may be based on an outcome of the evaluation. This means that action 704 may preferably be performed before action 702. This action is similar to action 208.

Figure 8:
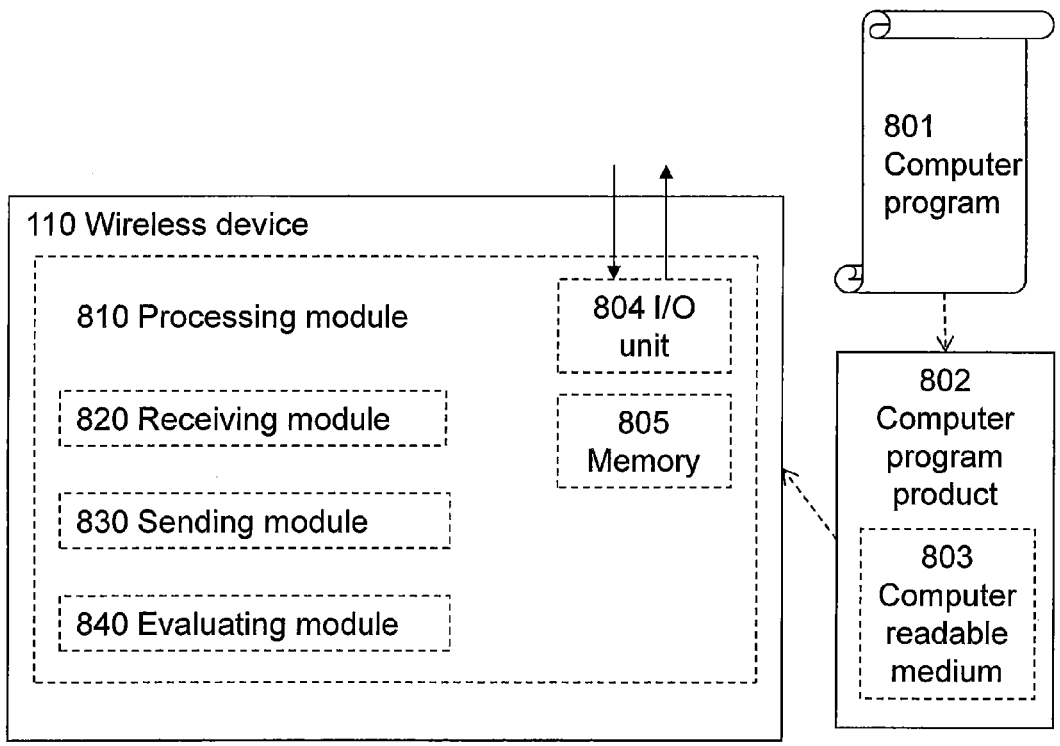
FIG. 8 is a block diagram illustrating embodiments of the wireless device.

With reference to FIG. 8, a schematic block diagram of the wireless device 110 is shown. The wireless device 110 is configured to perform the methods in FIG. 2, 3 and/or 6. Hence, the wireless device 110 is configured to provide information about availability of cellular connectivity towards a radio network node 130. As mentioned, the wireless device 110 has Wi-Fi radio for access to a wireless access node 120 and cellular radio for access to the radio network node 130.

According to some embodiments herein, the wireless device 110 may comprise a processing module 810. In further embodiments, the processing module 810 may comprise one or more of a receiving module 820, a sending module 830 and an evaluating module 840.

Therefore, the wireless device 110, the processing module 810 and/or the sending module 830 is configured to send, to the wireless access node 120, a second message, which indicates to the wireless access node 120 availability of the cellular connectivity. The second message may be a WNM-Notification-response, a GAS initial response/comeback request including an ANQP query with a special query element, a Probe request message and/or an Association Request. The second message may include a vendor specific information element during at-association.

The wireless device 110, the processing module 810 and/or the receiving module 820 may be configured to receive, from the wireless access node 120, a first message for querying information about the availability of the cellular connectivity. The first message may be a WNM-Notification-request.

Furthermore, the wireless device 110, the processing module 810 and/or the evaluating module 840 may be configured to evaluate the cellular connectivity towards the radio network node 130. The second message may be based on an outcome of the evaluation.

The wireless device 110 may further comprise an Input/Output (I/O) unit 804 configured to send and/or receive the first, second and/or third message, other messages, values, indications and the like as described herein. The I/O unit 804 may comprise the receiving module 820, the sending module 830, a transmitter and/or a receiver.

Furthermore, the wireless device 110 may comprise a memory 805 for storing software to be executed by, for example, the processing module when the processing module is implemented as a hardware module comprising at least one processor or the like.

Figure 3:
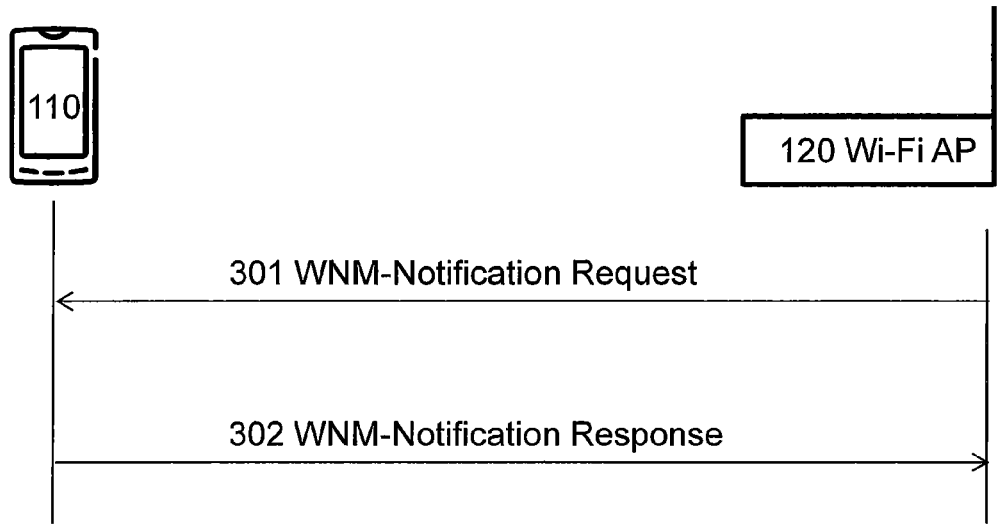
FIG. 3 is another schematic, combined signaling scheme and flowchart illustrating some first embodiments herein.

FIG. 8 also illustrates software in the form of a computer program 801, comprising computer readable code units which when executed on the wireless device 110 causes the wireless device 110 to perform the method according to FIGS. 2, 3, 6 and/or 7.

Finally, FIG. 8 illustrates a computer program product 802, comprising computer readable medium 803 and the computer program 801 as described directly above stored on the computer readable medium 803.

Figure 9:
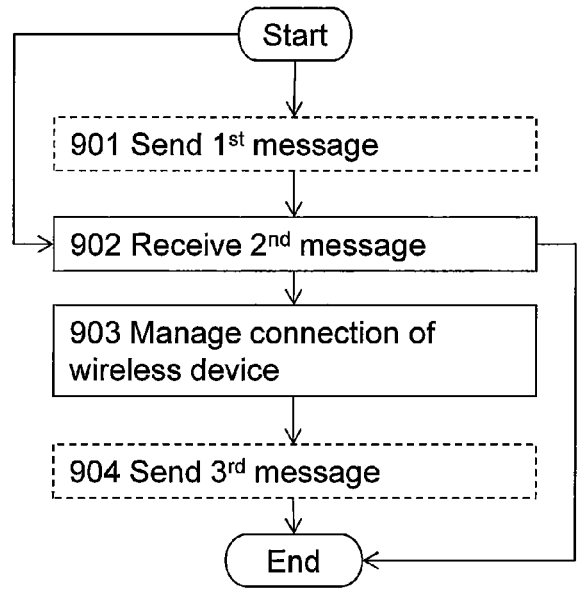
FIG. 9 is a flowchart illustrating embodiments of the method in the wireless access node.

In FIG. 9, an exemplifying, schematic flowchart of the method in the wireless access node 120 is shown. Hence, the wireless access node 120 performs a method for enabling management of cellular connectivity of a wireless device 110.

As mentioned, the cellular connectivity relates to connectivity towards a radio network node 130. The wireless device 110 has Wi-Fi radio for access to the wireless access node 120 and cellular radio for access to the radio network node 130

The following actions may be performed in any suitable order. These actions are similar to the actions in FIGS. 2, 3 and/or 6.

Action 901

The wireless access node 120 may send, to the wireless device 110, a first message for querying information about the availability of the cellular connectivity, whereby the first message causes the wireless device 110 to send the second message indicating the availability of the cellular connectivity. The first message may be a WNM-Notification-request. This action is similar to action 201.

Action 902

The wireless access node 120 receives, from the wireless device 110, a second message, which indicates to the wireless access node 120 availability of the cellular connectivity. This action is similar to action 204.

Action 903

The wireless access node 120 manages the cellular connectivity based on the second message. The second message may be a WNM-Notification-response, a GAS initial response/comeback request including an ANQP query with a special query element, a Probe request message and/or an Association Request. The second message may include a vendor specific information element during at-association.

The managing of the cellular connectivity may comprise instructing the wireless device 110 to use the cellular connectivity for transmissions to/from the wireless device 110.

This action is similar to action 205.

Action 904

Accordingly, based on the outcome of action 903, the wireless access node 120 may send a third message to the wireless device 110. The third message may indicate to the wireless device that access to the WLAN is denied. The wireless device 110 may then attempt to establish, if not already existing, a cellular connection to the radio network node 130. This action is similar to action 206.

Figure 10:
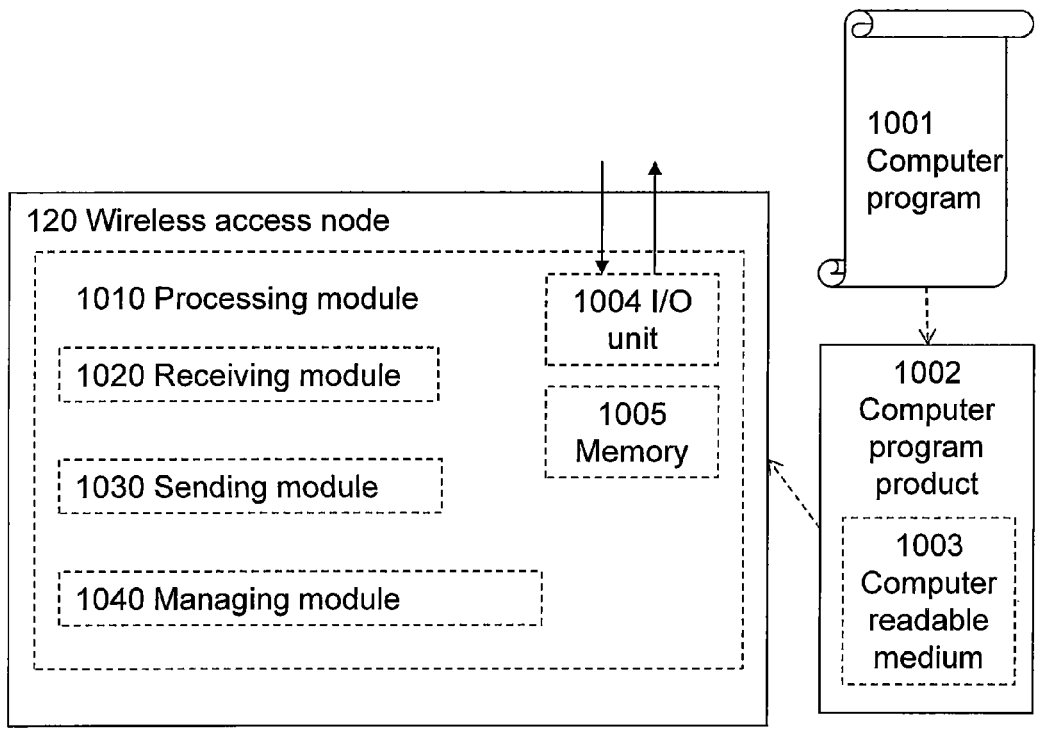
FIG. 10 is a block diagram illustrating embodiments of the wireless access node.

With reference to FIG. 10, a schematic block diagram of the wireless access node 120 is shown. The wireless access node 120 is configured to perform the methods in FIGS. 2, 3, 6 and/or 9. Hence, the wireless access node 120 is configured to enable management of cellular connectivity of a wireless device 110.

As mentioned, the cellular connectivity relates to connectivity towards a radio network node 130. The wireless device 110 has Wi-Fi radio for access to the wireless access node 120 and cellular radio for access to the radio network node 130.

According to some embodiments herein, the wireless access node 120 may comprise a processing module 1010. In further embodiments, the processing module 1010 may comprise one or more of a receiving module 1020, a sending module 1030 and managing module 1040.

Therefore, the wireless access node 120, the processing module 1010 and/or the receiving module 1020 is configured to receive, from the wireless device 110, a second message, which indicates to the wireless access node 120 availability of the cellular connectivity. The second message may be a WNM-Notification-response, a GAS initial response/comeback request including an ANQP query with a special query element, a Probe request message and/or an Association Request. The second message may include a vendor specific information element during at-association.

The wireless access node 120, the processing module 1010 and/or the managing module 1040 is configured to manage the cellular connectivity based on the second message. The wireless access node 120 may be configured to manage the cellular connectivity by instructing the wireless device 110 to use the cellular connectivity for transmissions to/from the wireless device 110.

Furthermore, the wireless access node 120, the processing module 1010 and/or the sending module 1030 may be configured to send, to the wireless device 110, a first message for querying information about the availability of the cellular connectivity. The first message may be a WNM-Notification-request.

The wireless access node 120 may further comprise an Input/Output (I/O) unit 1004 configured to send and/or receive the first, second and/or third messages, other messages, values, indications and the like as described herein. The I/O unit 1004 may comprise the receiving module 1020, the sending module 1030, a transmitter and/or a receiver.

Furthermore, the wireless access node 120 may comprise a memory 1005 for storing software to be executed by, for example, the processing module when the processing module is implemented as a hardware module comprising at least one processor or the like.

FIG. 10 also illustrates software in the form of a computer program 1001, comprising computer readable code units which when executed on the wireless access node 120 causes the wireless access node 120 to perform the method according to FIGS. 2, 3, 6 and/or 9.

Finally, FIG. 10 illustrates a computer program product 1002, comprising computer readable medium 1003 and the computer program 1001 as described directly above stored on the computer readable medium 1003.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "Number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless access node, for enabling management of cellular connectivity of a wireless device, wherein the cellular connectivity relates to connectivity towards a radio network node, wherein the wireless device has Wi-Fi radio for access to the wireless access node and cellular radio for access to the radio network node, the method comprising:
receiving, from the wireless device, a second message that is responsive to a first message that is sent to the wireless device, that indicates to the wireless access node availability of the cellular connectivity;
managing the cellular connectivity based on the second message by determining whether the wireless device is to access either the wireless access node or the radio network node,
wherein the second message is a WNM-Notification-response, a GAS initial response/comeback request including an ANQP query with a special query element, a Probe request message and/or an Association Request that comprises an indication of whether the wireless device can establish a cellular connection to the radio network node; and
sending, to the wireless device, a third message that indicates to the wireless device that access to a wireless local area network (WLAN) is unavailable responsive to the indication of the second message whether the wireless device can establish the cellular connection to the radio network node.

2. The method according to claim 1, wherein the method comprises:
sending, to the wireless device, the first message for querying information about the availability of the cellular connectivity, whereby the first message causes the wireless device to send the second message indicating the availability of the cellular connectivity.

3. The method according to claim 2, wherein the first message is a WNM-Notification-request.

4. The method according to claim 1, wherein the second message includes a vendor specific information element during at-association.

5. The method according to claim 1, wherein the managing of the cellular connectivity comprises instructing the wireless device to use the cellular connectivity for transmissions to/from the wireless device.

6. A computer program product comprising a non-transitory computer readable medium storing computer readable code which when executed on a wireless access node causes the wireless access node to perform the method according to claim 1.

7. The method according to claim 1, wherein managing the cellular connectivity based on the second message comprises instructing the wireless device to establish a cellular connection to the radio network node.

8. The method according to claim 1, wherein the second message is the WNM-Notification-response or the GAS initial response/comeback request including the ANQP query with the special query element.

9. A method, performed by a wireless device, for providing information about availability of cellular connectivity towards a radio network node, wherein the wireless device has Wi-Fi radio for access to a wireless access node and cellular radio for access to the radio network node, wherein the method comprises:
sending, to the wireless access node, a second message that is responsive to a first message that is received from the wireless access node, that indicates to the wireless access node availability of the cellular connectivity; and
receiving a third message from the wireless access node that indicates to the wireless device that access to a wireless local area network (WLAN) is unavailable, wherein the third message is responsive to the second message indicating the availability of the cellular connectivity,
wherein the second message is a WNM-Notification-response, a GAS initial response/comeback request including an ANQP query with a special query element, a Probe Request message and/or an Association Request that comprises an indication of whether the wireless device can establish a cellular connection to the radio network node.

10. The method according to claim 9, wherein the method comprises:
receiving, from the wireless access node, the first message for querying information about the availability of the cellular connectivity, whereby the first message causes the wireless device to send the second message indicating the availability of the cellular connectivity.

11. The method according to claim 10, wherein the first message is a WNM-Notification-request.

12. The method according to claim 9, wherein the second message includes a vendor specific information element during at-association.

13. The method according to claim 9, wherein the method comprises:
evaluating the cellular connectivity towards the radio network node, and wherein the second message is based on an outcome of the evaluation.

14. A computer program product comprising a non-transitory computer readable medium storing computer readable code which when executed on a wireless device causes the wireless device to perform the method according to claim 9.

15. A wireless access node configured to enable management of cellular connectivity of a wireless device, wherein the cellular connectivity relates to connectivity towards a radio network node, wherein the wireless device has Wi-Fi radio for access to the wireless access node and cellular radio for access to the radio network node, wherein the wireless access node is configured to:
receive, from the wireless device, a second message that is responsive to a first message that is sent to the wireless device, that indicates to the wireless access node availability of the cellular connectivity;

manage the cellular connectivity based on the second message by determining whether the wireless device is to access either the wireless access node or the radio network node, wherein the second message is a WNM-Notification-response, a GAS initial response/comeback request including an ANQP query with a special query element, a Probe request message and/or an Association Request that comprises an indication of whether the wireless device can establish a cellular connection to the radio network node; and send, to the wireless device, a third message that indicates to the wireless device that access to a wireless local area network (WLAN) is unavailable responsive to the indication of the second message whether the wireless device can establish the cellular connection to the radio network node.

16. The wireless access node according to claim 15, wherein the wireless access node is configured to send, to the wireless device, the first message for querying information about the availability of the cellular connectivity.

17. The wireless access node according to claim 16, wherein the first message is a WNM-Notification-request.

18. The wireless access node according to claim 15, wherein the second message includes a vendor specific information element during at-association.

19. The wireless access node according to claim 15, wherein the wireless access node is configured to manage the cellular connectivity by instructing the wireless device to use the cellular connectivity for transmissions to/from the wireless device.

20. A wireless device configured to provide information about availability of cellular connectivity towards a radio network node, wherein the wireless device has Wi-Fi radio for access to a wireless access node and cellular radio for access to the radio network node, wherein the wireless device is configured to:

send, to the wireless access node, a second message that is responsive to a first message that is received from the wireless access node, that indicates to the wireless access node availability of the cellular connectivity; and receive a third message from the wireless access node that indicates to the wireless device that access to a wireless local area network (WLAN) is unavailable, wherein the third message is responsive the message indicating the availability of the cellular connectivity, wherein the second message is a WNM-Notification-response, a GAS initial response/comeback request including an ANQP query with a special query element, a Probe request message and/or an Association Request that comprises an indication of whether the wireless device can establish a cellular connection to the radio network node.

21. The wireless device according to claim 20, wherein the wireless device is configured to receive, from the wireless access node, the first message for querying information about the availability of the cellular connectivity.

22. The wireless device according to claim 21, wherein the first message is a WNM-Notification-request.

23. The wireless device according to claim 20, wherein the second message includes a vendor specific information element during at-association.

24. The wireless device according to claim 20, wherein the wireless device is configured to evaluate the cellular connectivity towards the radio network node; and wherein the second message is based on an outcome of the evaluation.

* * * * *

UNITED STATES PATENT AND TRADEMARK OFFICE
CERTIFICATE OF CORRECTION

PATENT NO. : 9,585,066 B2
APPLICATION NO. : 14/405333
DATED : February 28, 2017
INVENTOR(S) : Mestanov et al.

Page 1 of 1

It is certified that error appears in the above-identified patent and that said Letters Patent is hereby corrected as shown below:

On the Title Page

In Item (74), under "Attorney, Agent, or Firm", in Column 2, Line 1, delete "Myers Bigel, P.A." and insert -- Myers Bigel Sibley & Sajovec, P.A. --, therefor.

On Page 2, in Item (56), under "OTHER PUBLICATIONS", in Column 2, Line 12, delete "802.1"," and insert -- 802.1)", --, therefor.

In the Specification

In Column 8, Line 2, delete "radio network node 120." and insert -- radio network node 130. --, therefor.

In Column 8, Lines 5-6, delete "radio network node 120." and insert -- radio network node 130. --, therefor.

In Column 10, Line 38, delete "AP;" and insert -- AP. --, therefor.

In the Claims

In Column 18, Line 11, in Claim 20, delete "responsive the message" and insert -- responsive to the second message --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*